US 10,725,914 B2

(12) United States Patent
Pirvu

(10) Patent No.: US 10,725,914 B2
(45) Date of Patent: *Jul. 28, 2020

(54) LIGHTWEIGHT MECHANISMS FOR SELECTING INFREQUENTLY EXECUTED METHODS FOR EVICTION FROM CODE CACHE

(71) Applicant: International Business Machines Corporation, Armonk, NY (US)

(72) Inventor: Marius Pirvu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,389

(22) Filed: Apr. 30, 2019

(65) Prior Publication Data

US 2019/0258571 A1    Aug. 22, 2019

Related U.S. Application Data

(63) Continuation of application No. 15/485,981, filed on Apr. 12, 2017, now Pat. No. 10,318,421.

(51) Int. Cl.
*H01L 35/34* (2006.01)
*G06F 12/0808* (2016.01)
(Continued)

(52) U.S. Cl.
CPC .......... *G06F 12/0808* (2013.01); *G06F 11/34* (2013.01); *G06F 12/0875* (2013.01);
(Continued)

(58) Field of Classification Search
CPC ............. G06F 12/0808; G06F 12/1009; G06F 12/128; G06F 12/12; G06F 12/0815; G06F 2212/621
See application file for complete search history.

(56) References Cited

U.S. PATENT DOCUMENTS 7,856,531 B2 * 12/2010 Bruening ............ G06F 12/0875
711/129
9,069,876 B2    6/2015 Uola et al.
(Continued)

OTHER PUBLICATIONS

Corbato, "A paging Experiment with the Multics System"< Massachusetts Institute of Technology, dated Jul. 8, 1968, pp. 217-228.
(Continued)

*Primary Examiner* — Ramon A. Mercado
(74) *Attorney, Agent, or Firm* — Scully, Scott, Murphy & Presser, P.C.; Nicholas Bowman, Esq.

(57) ABSTRACT

An infrequently used method is selected for eviction from a code cache repository by accessing a memory management data structure from an operating system, using the data structure to identify a first set of pages that are infrequently referenced relative to a second set of pages, determining whether or not a page of the first set of pages is part of a code cache repository and includes at least one method, in response to the page of the first set of pages being part of the code cache repository and including at least one method, flagging the at least one method as a candidate for eviction from the code cache repository, determining whether or not a code cache storage space limit has been reached for the code cache repository, and, in response to the storage space limit being reached, evicting the at least one flagged method from the code cache repository.

20 Claims, 6 Drawing Sheets

(51) Int. Cl.
*G06F 12/1009* (2016.01)
*G06F 12/128* (2016.01)
*G06F 11/34* (2006.01)
*G06F 12/0875* (2016.01)
*G06F 12/122* (2016.01)
*G06F 11/30* (2006.01)
*G06F 12/12* (2016.01)

(52) U.S. Cl.
CPC ........ *G06F 12/1009* (2013.01); *G06F 12/122* (2013.01); *G06F 12/128* (2013.01); *G06F 11/3037* (2013.01); *G06F 11/3055* (2013.01); *G06F 12/12* (2013.01); *G06F 2201/885* (2013.01); *G06F 2212/1024* (2013.01); *G06F 2212/452* (2013.01); *G06F 2212/502* (2013.01); *G06F 2212/621* (2013.01)

(56) References Cited

U.S. PATENT DOCUMENTS

| | | | | |
|---|---|---|---|---|
| 9,268,543 | B1* | 2/2016 | Doyle | G06F 9/45525 |
| 2010/0174869 | A1* | 7/2010 | Gorobets | G06F 12/0246 |
| | | | | 711/135 |
| 2018/0300243 | A1 | 10/2018 | Pirvu | |

OTHER PUBLICATIONS

Hazelwood, et al., "Code Cache Management Schemes for Dynamic Optimizers", proceedings of the Sixth Annual Workshop on Interaction between Compliers and computer Architectures, Feb. 2002, pp. 1-9.

Zhang, et al., "Profile-driven Code Unloading for Resource-Constructed JVMs", Proceedings of the 3rd International symposium on Principes and prctice of programming in Java, Jun. 16-18, 2004 pp. 1-7.

Denning, "The Working Set Model for Program Behavior", Communications of the ACM, vol. 11 Issue 5, May 1968, pp. 323-333.

Anthony, et al. "To JIT or not to JIT: The Effect of Code Pitching on the Performance of .NET Framework", 3nd International Conference on .NET Technologies, Pilsen (Czech Republic), May 30-Jun. 1, 2005, pp. 1-8.

Gorman, "Understanding the Linux Virtual Memory Manager", https://www.kernel.org/doc/gorman/pdf/understand.pdf, Jul. 9, 2007, pp. 1-713.

Carr, et al. "WSCLOCK—A Simple and Effective Algorithm for Virtual Memory Management", SIGOPS Operating Systems Review 15(5), Dec. 1981, pp. 87-95.

Hazelwood et al, "Generational Cache Management Code Traces in Dynamic Optimization Systems", Proceedings of the 36th International Symposium on Microarchitecture (MICRO-36 2003), Nov. 2003, pp. 1-11.

List of IBM Patents or Patent Applications Treated as Related.

* cited by examiner

LIGHTWEIGHT MECHANISMS FOR SELECTING INFREQUENTLY EXECUTED METHODS FOR EVICTION FROM CODE CACHE

FIELD

The present disclosure relates generally to software systems where compilation is performed dynamically (at runtime) and a result of the compilation is cached in a repository of limited size. More specifically, this disclosure relates to mechanisms for selecting and evicting infrequently executed methods from a code cache.

BACKGROUND

As the term is used in this document, a "virtual machine" is a set of computer code that emulates a computer system in a manner that: (i) is based on computer architectures of a computer (for example, a physical computer including substantial hardware), and (ii) provides the functionality of a computer (for example, a physical computer including substantial hardware). Implementations of virtual machines (sometimes herein referred to as "instances" or "instantiations") may involve specialized hardware, software or a combination of hardware and software.

Containers are similar to virtual machines but, being simply a process, containers are much quicker to start up and initialize. In some cases, use of containers may require extensive initialization. For example, creating a set of containers to work together requires configuration, setup, and validation. A pooled item would be comprised of a set of cooperating containers. In some situations, significant setup time is required, such as when a private virtual network needs to be set up in conjunction with the containers. This would mean that network resources would need to be a part of the pooling trade-off, since limited resources are involved. Thus, pooling may involve pooling a cooperative set of virtual machines, a cooperative set of container instances, or any of various combinations thereof.

Some virtual machines (VMs) include the following: (i) system virtual machines (also termed full virtualization VMs); (ii) process virtual machines designed to execute computer programs in a platform-independent environment; and (iii) VMs designed to also emulate different architectures and allow execution of software applications and operating systems written for another CPU or architecture. VMs are sometimes pre-allocated into instance pools. What this means is that images for an identifiable set (called a "pool") of virtual machines are instantiated and initialized. Then, one or more virtual machine images is started in operation and allocated to be assigned to perform computational workloads, from a single source, acting as a unit.

In some virtual machines, such as Java™ virtual machines (JVMs), one or more methods are compiled at run time by a Just-In-Time (JIT) compiler which prepares compiled bodies. The compiled bodies are stored in a repository which may be referred to as a code cache. The code cache is allowed to expand as needed, but for practical purposes, JVMs impose limits on such growth. In some cases, this code cache limit is dictated by hard constraints related to the availability of physical memory. This limit may come into play in embedded environments where memory resources are scarce. In other cases, such as in cloud computing environments, the limit is derived from a desired design objective to have a high density of applications running concurrently on the same machine.

In yet other cases, the code cache limit may be imposed by pecuniary decisions. For instance, in a platform-as-a-service (PaaS) environment, customers may pay for the memory that they use. Moreover, some Java™ applications are so large that a set of methods that the JVM needs to compile will exceed the code cache limit. When the code cache limit is reached, the JVM stops compiling and the methods that would otherwise be compiled are forced to execute interpreted. In turn, this can have a significant negative impact on performance because executing a compiled method is typically at least ten times faster than executing an interpreted method.

One potential solution to the code cache limit problem is code pitching, where the entire code cache is flushed once the code cache limit has been reached. However, in the aftermath of the code cache flush, performance is likely to suffer a great deal because many methods that are still in use will need to be recompiled. It is possible to avoid this drop in performance by evicting code fragments from the code cache in a First-In, First-Out (FIFO) manner. The code cache is conceptualized as a big circular buffer, and eviction takes place on demand when a new method needs to be stored in the code cache. However, this approach does not perform an intelligent selection of which methods are retained and which methods are selected for eviction.

One possible idea is to instrument native code to keep statistics on method invocations to determine which methods are invoked frequently, and which methods are invoked less frequently. Although this idea sounds appealing, counting the invocations requires a set of counting instructions that increases the length of the corresponding code path, thereby adversely impacting performance. In order to ameliorate this performance impact, after the counting instructions are executed, these instructions could be patched into a No Operation (NOP) instruction. Basically, the NOP instruction is an assembly language instruction, programming language statement, or computer protocol command that does nothing Replacing the counting instructions with NOP instructions is a palliative measure for at least two reasons. First, NOP instructions still increase path length, albeit the NOP instructions are relatively cheap to execute. Second, patching at run time needs to be performed atomically, and therefore it is necessary to provide proper instruction alignment, with the result that even larger NOP sequences may need to be employed for padding.

Another possible approach is to use a sampling technique to identify frequently executed methods. However, this approach is too coarse to be useful in practice. For applications that have relatively flat execution profiles where there is no clear hot-spot involving two or three methods, this approach does not work. The primary problem is that an adequate number of samples from many relatively important methods will not be obtained in a timely manner.

Yet another approach logically splits the code cache into three regions: a nursery region, a probation cache, and a persistent cache. The nursery region is managed as a FIFO buffer. Newly-compiled code enters the nursery region. When the nursery region becomes full, the oldest methods are pushed into the probation cache. The main role of the probation cache is to detect infrequently executed code. If space needs to be created in the probation cache, any frequently executed methods that are currently residing in the probation cache are evicted into the persistent cache. At this point, any infrequently executed methods are subject to being permanently discarded from the persistent cache.

This three-region approach has some shortcomings. First, the detection of the infrequently executed methods requires some form of executing or accessing a counting mechanism, thereby adding computational overhead. Next, moving the compiled code from one region to another requires that the code to be in a relocatable form. Code that is in a relocatable form is generally slower than code that is not configured for relocation. Moreover, the JVM needs to perform some bookkeeping to fix and update all direct calls whenever a compiled body is moved. Additionally, an appropriate sizing of the three regions is critical in order for this technique to function properly. However, such sizing may be dependent upon the specifics of a given application, and it may not be possible to select sizing parameters that function across a wide variety of applications. Thus, there exists a need to overcome at least one of the preceding deficiencies and limitations of the related art.

SUMMARY

The following summary is merely intended to be exemplary. The summary is not intended to limit the scope of the claims.

A computer-implemented method, in one aspect, may comprise determining whether or not a current occupancy level of a code cache repository is meeting or exceeding a predetermined or specified threshold level; in response to the current occupancy level of the code cache repository meeting or exceeding the predetermined or specified threshold level, traversing an operating system data structure to locate a respective page table entry corresponding to a candidate virtual memory page of a plurality of virtual memory pages that are a part of the code cache repository; determining whether or not the candidate virtual memory page is in a physical memory; in response to determining that the candidate virtual memory page is not in a physical memory, adding a page corresponding to the candidate virtual memory page to a first candidate list; determining whether or not the first candidate list contains a first memory block and a second memory block, wherein the first memory block is adjacent in memory to the second memory block; in response to the first candidate list containing the first memory block and the second memory block wherein the first memory block is adjacent in memory to the second memory block, merging the first memory block and the second memory block to form a first evictable superblock of a plurality of evictable superblocks, each of the plurality of evictable superblocks being associated with a corresponding block size; ordering the plurality of evictable superblocks according to the corresponding block size; performing a test to ascertain whether or not the current cache occupancy level of the code cache repository meets or exceeds the predetermined or specified level; performing a test to ascertain whether or not the first candidate list is empty; and in response to the current cache code occupancy level of the code cache repository meeting or exceeding the predetermined or specified level and the first candidate list not being empty, evicting one or more methods contained in a largest evictable superblock of the plurality of evictable superblocks from the code cache repository.

The computer-implemented method, in a further aspect, may comprise performing a test to ascertain whether or not the candidate virtual memory page is on an inactive list and a referenced flag is set; in response to the candidate virtual memory page being on an inactive list and the referenced flag not being set, adding a page corresponding to the candidate virtual memory page to a second candidate list; determining whether or not the current occupancy level of the code cache repository is meeting or exceeding the predetermined or specified threshold level; in response to the current occupancy level of the code cache repository meeting or exceeding the predetermined or specified threshold level, determining whether or not the second candidate list contains a third memory block and a fourth memory block, wherein the third memory block is adjacent in memory to the fourth memory block; in response to the second candidate list containing the third memory block and the fourth memory block wherein the third memory block is adjacent in memory to the fourth memory block, merging the third memory block and the fourth memory block to form a second evictable superblock of a plurality of evictable superblocks, each of the plurality of evictable superblocks being associated with a corresponding block size; ordering the plurality of evictable superblocks according to the corresponding block size; performing a test to ascertain whether or not the current cache occupancy level of the code cache repository meets or exceeds the predetermined or specified level; and in response to the current cache code occupancy level of the code cache repository meeting or exceeding the predetermined or specified level, evicting one or more methods contained in a largest evictable superblock of the plurality of evictable superblocks from the code cache repository.

The computer-implemented method, in a further aspect, may comprise performing a test to ascertain whether or not the candidate virtual memory page is on an inactive list and a referenced flag is set; in response to the candidate virtual memory page being on an inactive list and the referenced flag being set, adding a page corresponding to the candidate virtual memory page to a third candidate list; determining whether or not the current occupancy level of the code cache repository is meeting or exceeding the predetermined or specified threshold level; in response to the current occupancy level of the code cache repository meeting or exceeding the predetermined or specified threshold level, determining whether or not the third candidate list contains a fifth memory block and a sixth memory block, wherein the fifth memory block is adjacent in memory to the sixth memory block; in response to the third candidate list containing the fifth memory block and the sixth memory block wherein the fifth memory block is adjacent in memory to the sixth memory block, merging the fifth memory block and the sixth memory block to form a third evictable superblock of a plurality of evictable superblocks, each of the plurality of evictable superblocks being associated with a corresponding block size; ordering the plurality of evictable superblocks according to the corresponding block size; performing a test to ascertain whether or not the current cache occupancy level of the code cache repository meets or exceeds the predetermined or specified level; and in response to the current cache code occupancy level of the code cache repository meeting or exceeding the predetermined or specified level, evicting one or more methods contained in a largest evictable superblock of the plurality of evictable superblocks from the code cache repository.

A computer-implemented method, in another aspect, may comprise accessing at least one memory management data structure from an operating system, using the at least one memory management data structure to identify a first set of one or more pages that are infrequently referenced relative to a second set of one or more pages, determining whether or not at least one page of the first set of one or more pages is part of a code cache repository and includes at least one method, in response to the at least one page being part of the code cache repository and including at least one method, flagging the at least one method as a candidate for eviction from the code cache repository, determining whether or not a code cache storage space limit has been reached for the code cache repository, and, in response to the code cache storage space limit being reached, evicting the at least one flagged method from the code cache repository.

A computer program product, in another aspect, may comprise a computer-readable storage medium having a computer-readable program stored therein, wherein the computer-readable program, when executed on a computing device including at least one processor, causes the at least one processor to determine whether or not a current occupancy level of a code cache repository is meeting or exceeding a predetermined or specified threshold level; in response to the current occupancy level of the code cache repository meeting or exceeding the predetermined or specified threshold level, traverse an operating system data structure to locate a respective page table entry corresponding to a candidate virtual memory page of a plurality of virtual memory pages that are a part of the code cache repository; determine whether or not the candidate virtual memory page is in a physical memory; in response to determining that the candidate virtual memory page is not in a physical memory, add a page corresponding to the candidate virtual memory page to a first candidate list; determine whether or not the first candidate list contains a first memory block and a second memory block, wherein the first memory block is adjacent in memory to the second memory block; in response to the first candidate list containing the first memory block and the second memory block wherein the first memory block is adjacent in memory to the second memory block, merge the first memory block and the second memory block to form a first evictable superblock of a plurality of evictable superblocks, each of the plurality of evictable superblocks being associated with a corresponding block size; order the plurality of evictable superblocks according to the corresponding block size; perform a test to ascertain whether or not the current cache occupancy level of the code cache repository meets or exceeds the predetermined or specified level; perform a test to ascertain whether or not the first candidate list is empty; and in response to the current cache code occupancy level of the code cache repository meeting or exceeding the predetermined or specified level and the first candidate list not being empty, evict one or more methods contained in a largest evictable superblock of the plurality of evictable superblocks from the code cache repository.

The computer program product, in a further aspect, may be further configured for performing a test to ascertain whether or not the candidate virtual memory page is on an inactive list and a referenced flag is set; in response to the candidate virtual memory page being on an inactive list and the referenced flag not being set, adding a page corresponding to the candidate virtual memory page to a second candidate list; determining whether or not the current occupancy level of the code cache repository is meeting or exceeding the predetermined or specified threshold level; in response to the current occupancy level of the code cache repository meeting or exceeding the predetermined or specified threshold level, determining whether or not the second candidate list is contains a third memory block and a fourth memory block, wherein the third memory block is adjacent in memory to the fourth memory block; in response to the second candidate list containing the third memory block and the fourth memory block wherein the third memory block is adjacent in memory to the fourth memory block, merging the third memory block and the fourth memory block to form a second evictable superblock of a plurality of evictable superblocks, each of the plurality of evictable superblocks being associated with a corresponding block size; ordering the plurality of evictable superblocks according to the corresponding block size; performing a test to ascertain whether or not the current cache occupancy level of the code cache repository meets or exceeds the predetermined or specified level; and in response to the current cache code occupancy level of the code cache repository meeting or exceeding the predetermined or specified level, evicting one or more methods contained in a largest evictable superblock of the plurality of evictable superblocks from the code cache repository.

The computer program product, in a further aspect, may be further configured for performing a test to ascertain whether or not the candidate virtual memory page is on an inactive list and a referenced flag is set; in response to the candidate virtual memory page being on an inactive list and the referenced flag being set, adding a page corresponding to the candidate virtual memory page to a third candidate list; determining whether or not the current occupancy level of the code cache repository is meeting or exceeding the predetermined or specified threshold level; in response to the current occupancy level of the code cache repository meeting or exceeding the predetermined or specified threshold level, determining whether or not the third candidate list contains a fifth memory block and a sixth memory block, wherein the fifth memory block is adjacent in memory to the sixth memory block; in response to the third candidate list containing the fifth memory block and the sixth memory block wherein the fifth memory block is adjacent in memory to the sixth memory block, merging the fifth memory block and the sixth memory block to form a third evictable superblock of a plurality of evictable superblocks, each of the plurality of evictable superblocks being associated with a corresponding block size; ordering the plurality of evictable superblocks according to the corresponding block size; performing a test to ascertain whether or not the current cache occupancy level of the code cache repository meets or exceeds the predetermined or specified level; and in response to the current cache code occupancy level of the code cache repository meeting or exceeding the predetermined or specified level, evicting one or more methods contained in a largest evictable superblock of the plurality of evictable superblocks from the code cache repository.

A computer program product, in another aspect, may comprise a computer-readable storage medium having a computer-readable program stored therein, wherein the computer-readable program, when executed on a computing device including at least one processor, causes the at least one processor to access at least one memory management data structure from an operating system, use the at least one memory management data structure to identify a first set of one or more pages that are infrequently referenced relative to a second set of one or more pages, determine whether or not at least one page of the first set of one or more pages is part of a code cache repository and includes at least one method, in response to the at least one page being part of the code cache repository and including at least one method, flag the at least one method as a candidate for eviction from the code cache repository, determine whether or not a code cache storage space limit has been reached for the code cache repository, and, in response to the code cache storage space limit being reached, evict the at least one flagged method from the code cache repository.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
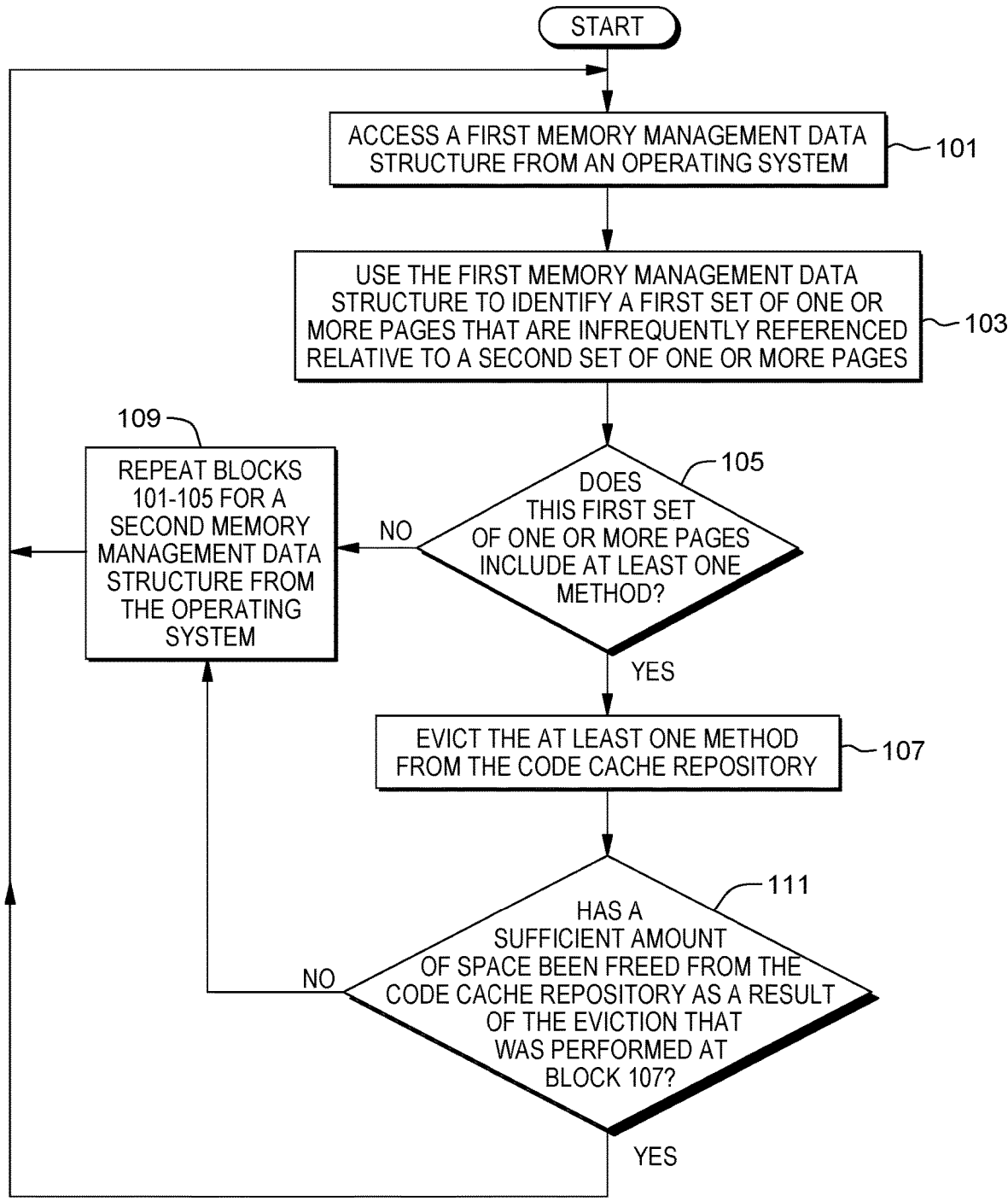
FIG. 1 illustrates a first exemplary computer-implemented method for flagging an infrequently executed method for eviction from a code cache in accordance with one or more embodiments of the present invention.

Some embodiments of the present invention may recognize one, or more, of the following opportunities for improvement, drawbacks, design imperatives and/or problems respecting the flagging of infrequently executed methods for eviction from a code cache: (i) improvements in the flagging of infrequently executed methods for eviction from a code cache can decrease server deployment time and thereby improve a user's cloud computing experience; (ii) providing the best possible cloud experience for users; (iii) a user's cloud computing experience is influenced significantly by end-to-end virtual server deployment; (iv) some factors that influence server deployment on a cloud hosting service include: ease of use of user interface (for example, simplicity of user interface design), amount of server customization options and/or amount of time required for server deployment; (v) server customization options may include, for example, box resource size, hosting region, and image type; (vi) server deployment time is of particular interest in the cloud; (vii) deployment time can either make or break a hosting service; (viii) shorter deployment times (when creating a new server instance in a cloud provider's cloud) can attract new users and thereby increase revenue and/or profits of the cloud provider; and/or (ix) as a practical matter, it is often challenging to achieve a best-in-class deployment time.

A modern operating system (OS) uses sophisticated memory management techniques that attempt to keep in physical memory only those memory pages that are frequently accessed. These frequently accessed pages may be regarded as a working set for one or more applications. The remainder of the pages are stored on disk and thus said to be swapped out, but these pages can be loaded on demand as the swapped-out pages are accessed. When a memory page is brought into physical memory, another page may have to be evicted and possibly written out to disk if the page is "dirty," or in other words, if anything has been written to the page. To implement an efficient replacement policy, the operating system keeps information about which pages have been accessed recently, and which pages are unlikely to be accessed.

For purposes of illustration, assume that a Linux™ OS is to be used. Linux™ employs data structures in the form of two lists of physical page frames to keep track of memory usage patterns. These two lists include an active list of physical page frames and an inactive list of physical page frames. The active list comprises a working set of all processes. The inactive list comprises physical page frames that are subject to being reclaimed. A page is first placed on the inactive list. If the page is accessed while on this list, a "referenced" flag will be set. If the page is accessed again while the referenced flag is set, the page will be moved to the active list and the referenced flag will be reset. The active list is maintained using a pseudo-least recently used (LRU) algorithm known as a "clock algorithm". Infrequently accessed pages on the active list are moved back to the inactive list.

According to one set of embodiments disclosed herein, one or more OS data structures related to virtual memory management are leveraged to determine a set of one or more frequently used methods. Basically, if a page from the code cache repository contains code that is rarely executed, this page is likely to already be swapped out (not present in physical memory), or if the page is not yet swapped out, then such a page is a good candidate for being swapped out in the near future. One advantage of this approach is that all of the heavy lifting (monitoring) is performed by the OS, while the overhead incurred by the JVM is minimal. One relatively minor inconvenience is that a kernel driver/module needs to be implemented to access one or more private data structures of the kernel from user space. This kernel driver is specific to each particular OS.

FIG. 1 illustrates a first exemplary method for flagging an infrequently executed method for eviction from a code cache in accordance with one or more embodiments of the present invention. The method is triggered by an event of reaching a code cache space limit for the code cache. The method commences at block 101 where a first memory management data structure from an operating system is accessed. For example, the first memory management data structure may comprise a first set of one or more respective page table entries (PTEs), each of the PTEs being associated with a corresponding page of memory. Next, at block 103, the first memory management data structure is used to identify a first set of one or more pages that are infrequently referenced relative to a second set of one or more pages. This identified set of one or more pages is comprised of pages that we know belong to the code cache repository.

The method advances to block 105 where a test is performed to determine whether or not at least one page of the first set of one or more pages includes at least one method. The negative branch from block 105 leads to block 109 where blocks 101-105 are repeated for a second memory management data structure from the operating system. For example, the second memory management data structure may comprise a second set of one or more respective page table entries (PTEs), each of the PTEs being associated with a corresponding page of memory.

In response to the at least one page including at least one method, the affirmative branch from block 105 leads to block 107 where the at least one method is evicted from the code cache repository. The method then advances to block 111 where a test is performed to determine whether or not a sufficient amount of space has been freed from the code cache repository as a result of the eviction that was performed at block 107. The negative branch from block 111 leads to block 109 where blocks 101-105 are repeated for a second memory management data structure from the operating system.

FIGS. 2A-2D together comprise a flowchart illustrating a second exemplary computer-implemented method for flagging an infrequently executed method for eviction from a code cache in accordance with one or more embodiments of the present invention. The method commences at block 201 (FIG. 2A) where a test is performed to ascertain whether or not a current occupancy level of a code cache repository is meeting or exceeding a predetermined or specified threshold occupancy level. The current occupancy level may be determined as a proportion or ratio of occupied memory space in the code cache repository with reference to a total amount of available storage space in the code cache repository. The negative branch from block 201 leads to block 203 where the method waits for a predetermined or specified time interval and then loops back to block 201.

The affirmative branch from block 201 leads to block 205 where, in response to the current occupancy level of the code cache repository meeting or exceeding the threshold occupancy level, an operating system data structure is traversed to locate a respective page table entry corresponding to a candidate virtual memory page of a plurality of virtual memory pages that are a part of the code cache repository. The candidate virtual memory page may be conceptualized as a virtual memory page that is currently being tested. Then, at block 207, a test is performed to ascertain whether or not the respective page table entry corresponding to the candidate virtual memory page of the plurality of virtual memory pages is in a physical memory. The negative branch from block 207 leads to block 209 where, in response to determining that the candidate virtual memory page of the plurality of virtual memory pages is not in the physical memory, a page corresponding to the candidate virtual memory page is added to a first candidate list. The program then advances to block 221 (FIG. 2B). The affirmative branch from block 207 (FIG. 2A) leads to block 211 where, in response to determining that the candidate virtual memory page of the plurality of virtual memory pages is in the physical memory, a descriptor of a physical page frame is located for the candidate virtual memory page, and one or more characteristics associated with the physical page frame are determined.

Block 213 is reached from block 211. At block 213, a test is performed to ascertain whether or not the candidate virtual memory page is on an inactive list. The affirmative branch from block 213 leads to block 215 where a test is performed to ascertain whether or not a referenced flag is not set. The negative branch from block 215 leads to block 217 where the page corresponding to the candidate virtual memory page is added to a second candidate list. The affirmative branch from block 215 leads to block 219 where the page corresponding to the candidate virtual memory page is added to a third candidate list.

Figure 2A:
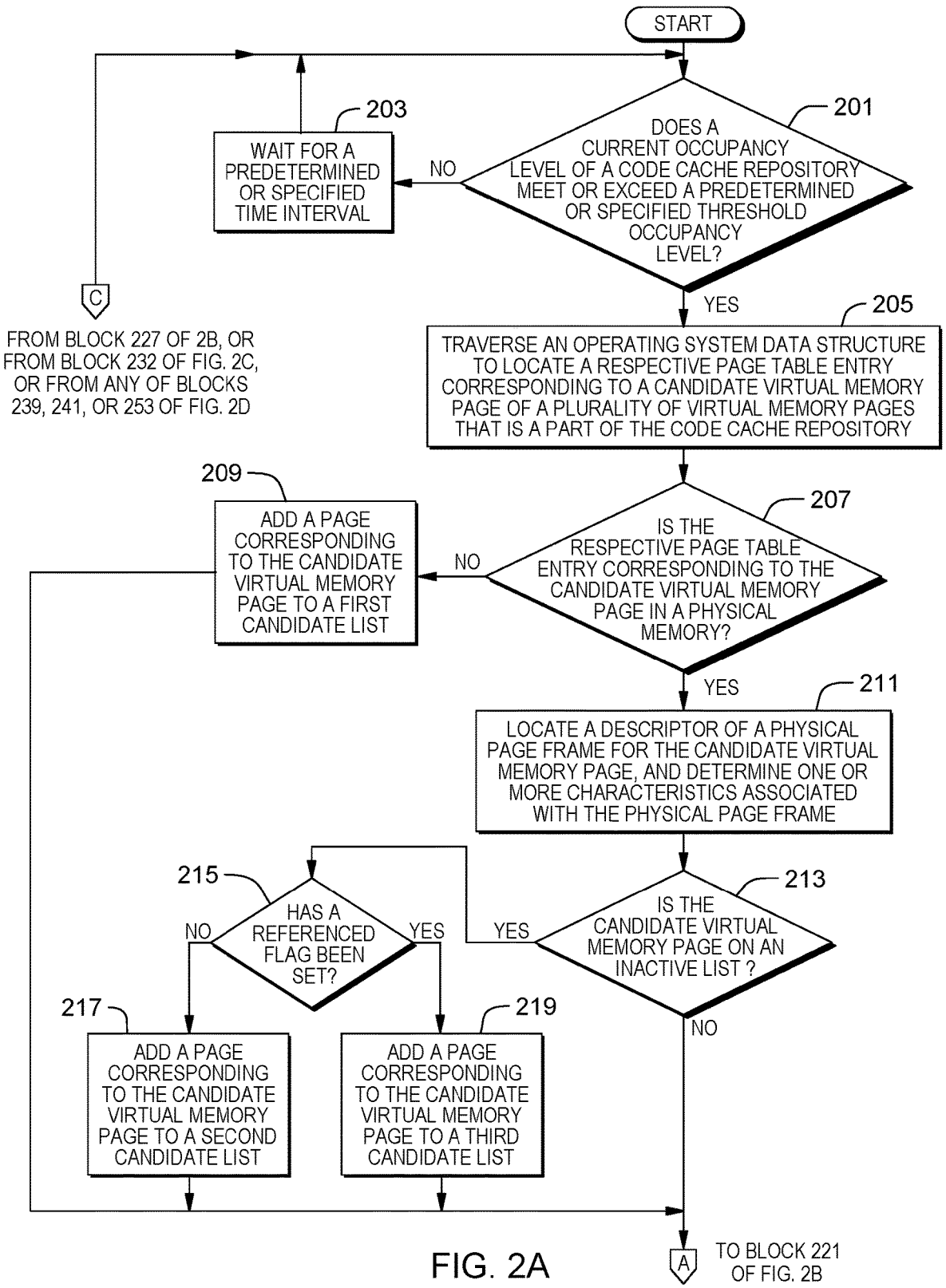
FIGS. 2A-2D together comprise a flowchart illustrating a second exemplary computer-implemented method for flagging an infrequently executed method for eviction from a code cache in accordance with one or more embodiments of the present invention.
Figure 2B:
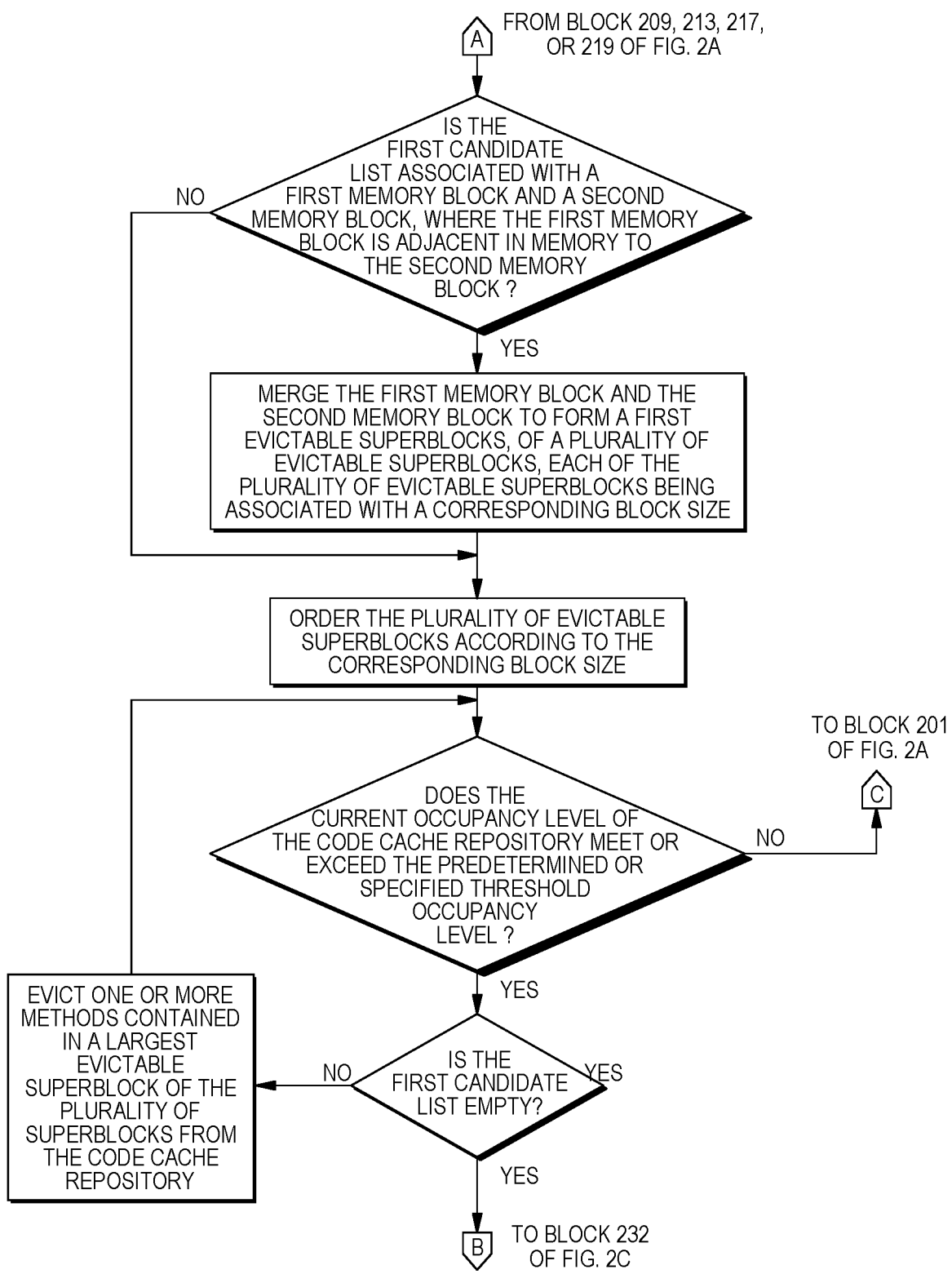
Figure 2C:
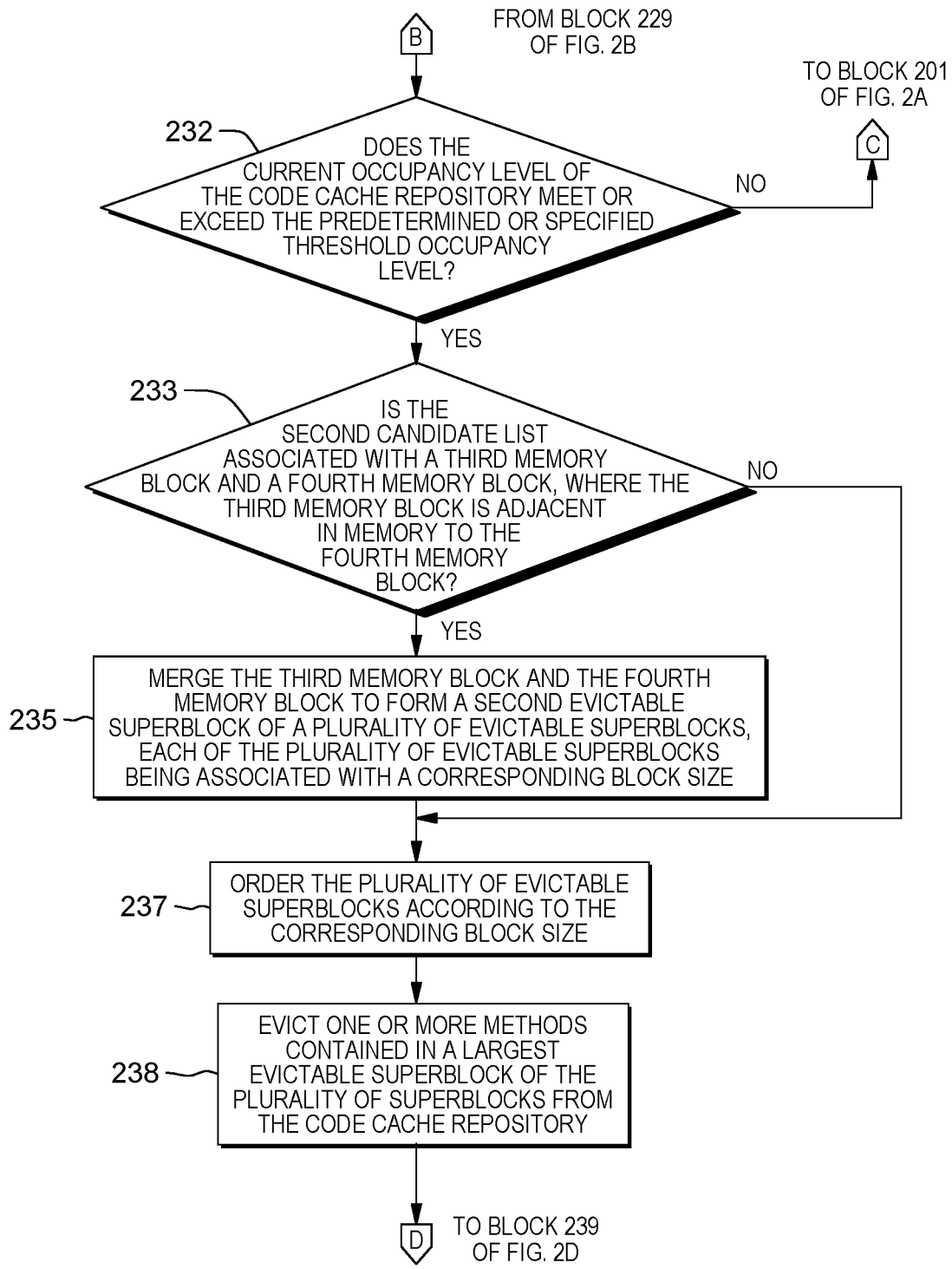
Figure 2D:
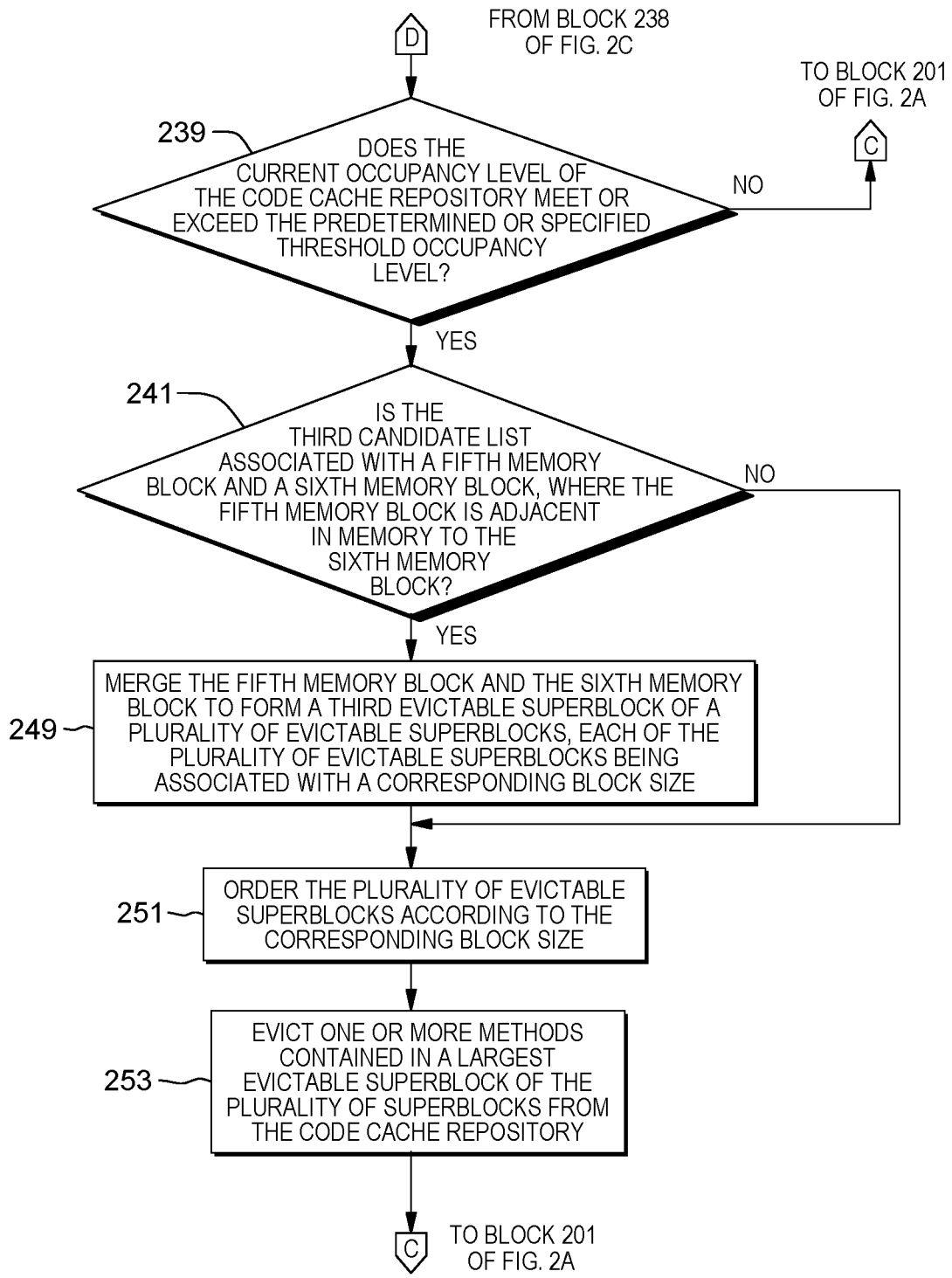

Block 221 (FIG. 2B) is reached from block 209 (FIG. 2A), or from block 217 (FIG. 2A), or from block 219 (FIG. 2A), or from the negative branch of block 213 (FIG. 2A). At block 221 (FIG. 2B), a test is performed to ascertain whether or not the first candidate list contains a first memory block and a second memory block, where the first memory block is adjacent in memory to the second memory block. If so, the program advances to block 223 where the first memory block and the second memory block are merged to form a first evictable superblock of a plurality of evictable superblocks, each of the plurality of evictable superblocks being associated with a corresponding block size. Then, at block 225, the plurality of evictable superblocks are ordered according to the corresponding block size. The negative branch from block 221 leads directly to block 225.

The program then advances from block 225 to block 227 where a test is performed to ascertain whether or not the current occupancy level of the code cache repository is greater than the predetermined or specified threshold occupancy level. As before, the current occupancy level may be determined as a proportion or ratio of occupied memory space in the code cache repository with reference to a total amount of available storage space in the code cache repository. The negative branch from block 227 leads back to block 201 (FIG. 2A). The affirmative branch from block 227 (FIG. 2B) leads to block 229 where a test is performed to ascertain whether or not the first candidate list is empty. The negative branch from block 229 leads to block 231 where one or more methods contained in a largest evictable superblock of the plurality of superblocks are evicted. Then the program loops back to block 227 where a test is performed to ascertain whether or not the current occupancy level of the code cache repository meets or exceeds the predetermined or specified threshold occupancy level.

The affirmative branch from block 229 (FIG. 2B) leads to block 232 (FIG. 2C) where a test is performed to ascertain whether or not the current occupancy level of the code cache repository is greater than the predetermined or specified threshold occupancy level. The negative branch from block 232 loops back to block 201 (FIG. 2A). At block 233 (FIG. 2C), in response to the current occupancy level of the code cache repository being greater than the predetermined or specified threshold occupancy level as determined at block 232, a test is performed to ascertain whether or not the second candidate list contains a third memory block that is adjacent in memory to a fourth memory block. If so, the program advances to block 235 where the third memory block and the fourth memory block are merged to form a second evictable superblock of a plurality of evictable superblocks, each of the plurality of evictable superblocks being associated with a corresponding block size. Next, at block 237, the plurality of evictable superblocks are ordered according to the corresponding block size. The negative branch from block 233 leads directly to block 237. Then, at block 238, one or more methods contained in a largest evictable superblock of the plurality of superblocks are evicted from the code cache repository.

The program then progresses from block 238 (FIG. 2C) to block 239 (FIG. 2D) where a test is performed to ascertain whether or not the current occupancy level of the code cache repository is greater than the predetermined or specified threshold occupancy level. As before, the current occupancy level may be determined as a proportion or ratio of occupied memory space in the code cache repository with reference to a total amount of available storage space in the code cache repository. The affirmative branch from block 239 leads to block 241 where a test is performed to ascertain whether or not the third candidate list contains a fifth memory block that is adjacent in memory to a sixth memory block. If so, the program advances to block 249 where the fifth memory block and the sixth memory block are merged to form a third evictable superblock of a plurality of evictable superblocks, each of the plurality of evictable superblocks being associated with a corresponding block size. The program then progresses from block 249 to block 251. Likewise, the negative branch from block 241 leads to block 251.

Next, at block 251, the plurality of evictable superblocks are ordered according to the corresponding block size. At block 253, one or more methods contained in a largest evictable superblock of the plurality of superblocks are evicted from the code cache repository. Then the program loops back to block 201 (FIG. 2A).

In the foregoing procedure, the first, second, and third candidate lists reflect different levels of a likelihood that a page will be accessed in a near future, and wherein processing of the evictable superblocks in decreasing order by size reduces fragmentation of free space in the code cache repository. The reduction of fragmentation improves the speed and efficiency of the code cache repository, resulting in an improved cloud experience for end users. In fact, this process creates an unparalleled user cloud server experience. Speed is of the essence.

Figure 3:
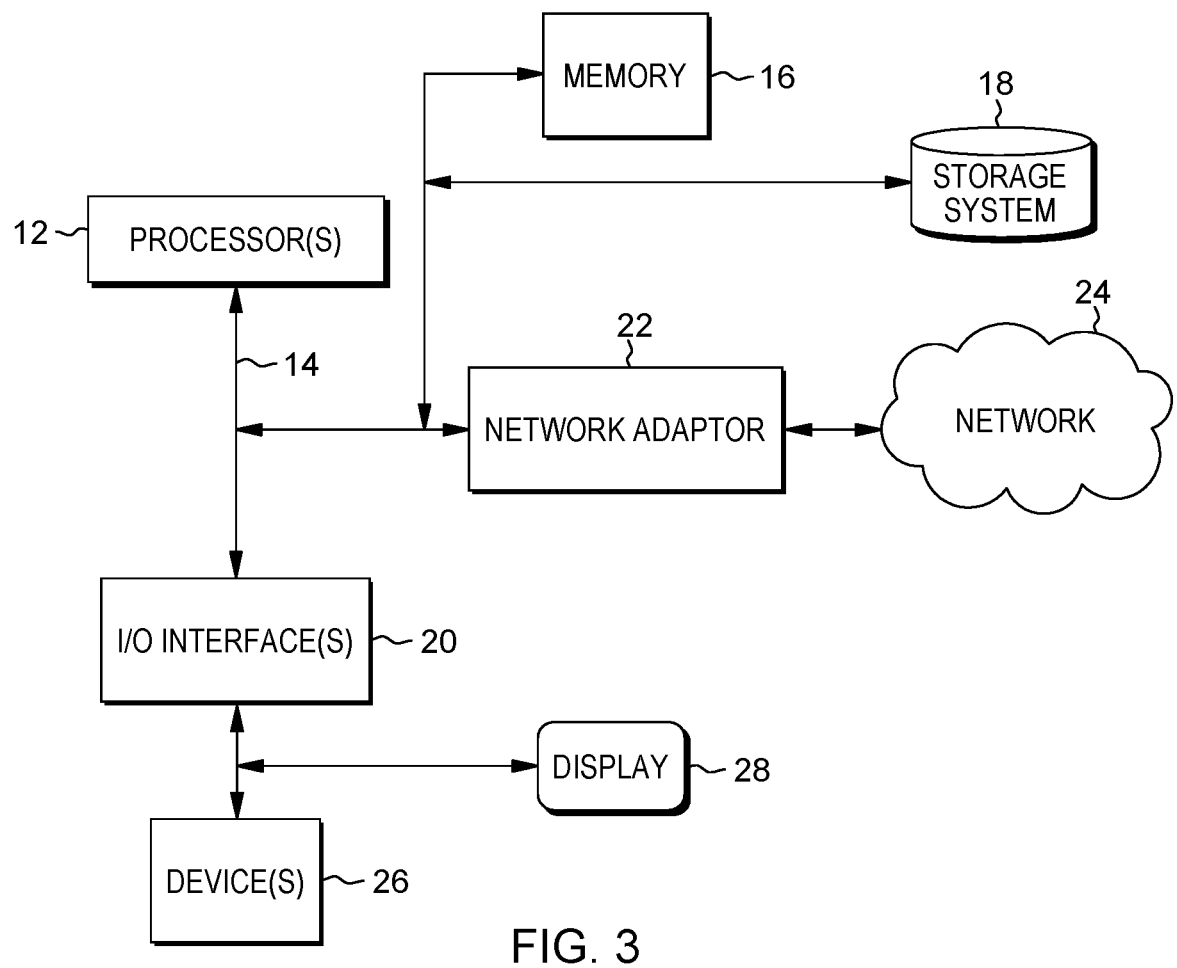
FIG. 3 illustrates an exemplary apparatus on which any of the methods of FIG. 1 or FIGS. 2A-2D may be performed in accordance with one or more embodiments of the present invention.

FIG. 3 illustrates an exemplary apparatus on which any of the methods of FIG. 1 or FIG. 2 may be performed in accordance with one or more embodiments of the present invention. This computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, neural networks, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module that performs the methods described herein. The module may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   in response to a determining that a candidate virtual memory page of a plurality of virtual memory pages is not in a physical memory, adding a page corresponding to the candidate virtual memory page to a first candidate list; and
   in response to the first candidate list containing a first memory block and a second memory block wherein the first memory block is adjacent in memory to the second memory block, merging the first memory block and the second memory block to form a first evictable superblock of a plurality of evictable superblocks.

2. The computer-implemented method of claim 1 further comprising:
   determining whether or not a current occupancy level of a code cache repository is meeting or exceeding a predetermined or specified threshold level; and
   in response to the current occupancy level of the code cache repository meeting or exceeding the predetermined or specified threshold level, traversing an operating system data structure to locate a respective page table entry corresponding to the candidate virtual memory page of a plurality of virtual memory pages that are a part of the code cache repository.

3. The computer-implemented method of claim 2 further comprising:
   determining whether or not the first candidate list contains a first memory block and a second memory block, wherein the first memory block is adjacent in memory to the second memory block, wherein each of the plurality of evictable superblocks is associated with a corresponding block size.

4. The computer-implemented method of claim 3 further comprising:
   ordering the plurality of evictable superblocks according to the corresponding block size;
   performing a test to ascertain whether or not the current cache occupancy level of the code cache repository meets or exceeds the predetermined or specified level;
   performing a test to ascertain whether or not the first candidate list is empty; and
   in response to the current cache code occupancy level of the code cache repository meeting or exceeding the predetermined or specified level and the first candidate list not being empty, evicting one or more methods contained in a largest evictable superblock of the plurality of evictable superblocks from the code cache repository to thereby reduce a fragmentation of free space in the code cache repository.

5. The computer-implemented method of claim 4 further comprising:
   performing a test to ascertain whether or not the candidate virtual memory page is on an inactive list and a referenced flag is set;
   in response to the candidate virtual memory page being on an inactive list and the referenced flag not being set, adding a page corresponding to the candidate virtual memory page to a second candidate list;
   determining whether or not the current occupancy level of the code cache repository is meeting or exceeding the predetermined or specified threshold level;
   in response to the current occupancy level of the code cache repository meeting or exceeding the predetermined or specified threshold level, determining whether or not the second candidate list contains a third memory block and a fourth memory block, wherein the third memory block is adjacent in memory to the fourth memory block; and
   in response to the second candidate list containing the third memory block and the fourth memory block wherein the third memory block is adjacent in memory to the fourth memory block, merging the third memory block and the fourth memory block to form a second evictable superblock of a plurality of evictable superblocks, each of the plurality of evictable superblocks being associated with a corresponding block size.

6. The computer-implemented method of claim 5 further comprising:
   ordering the plurality of evictable superblocks according to the corresponding block size; performing a test to ascertain whether or not the current cache occupancy level of the code cache repository meets or exceeds the predetermined or specified level; and
   in response to the current cache code occupancy level of the code cache repository meeting or exceeding the predetermined or specified level, evicting one or more methods contained in a largest evictable superblock of the plurality of evictable superblocks from the code cache repository to thereby reduce a fragmentation of free space in the code cache repository.

7. The computer-implemented method of claim 6 wherein the first candidate list corresponds to a first likelihood that the candidate virtual memory page will be accessed, and the second candidate list corresponds to a second likelihood that the candidate virtual memory page will be accessed, and the first likelihood is greater than the second likelihood.

8. The computer-implemented method of claim 6, further comprising:
   performing a test to ascertain whether or not the candidate virtual memory page is on an inactive list and a referenced flag is set;
   in response to the candidate virtual memory page being on an inactive list and the referenced flag being set, adding a page corresponding to the candidate virtual memory page to a third candidate list;
   determining whether or not the current occupancy level of the code cache repository is meeting or exceeding the predetermined or specified threshold level;
   in response to the current occupancy level of the code cache repository meeting or exceeding the predetermined or specified threshold level, determining whether or not the third candidate list contains a fifth memory block and a sixth memory block, wherein the fifth memory block is adjacent in memory to the sixth memory block; and
   in response to the third candidate list containing the fifth memory block and the sixth memory block wherein the fifth memory block is adjacent in memory to the sixth memory block, merging the fifth memory block and the sixth memory block to form a third evictable superblock of a plurality of evictable superblocks, each of the plurality of evictable superblocks being associated with a corresponding block size.

9. The computer-implemented method of claim 8, further comprising:
   ordering the plurality of evictable superblocks according to the corresponding block size;
   performing a test to ascertain whether or not the current cache occupancy level of the code cache repository meets or exceeds the predetermined or specified level; and
   in response to the current cache code occupancy level of the code cache repository meeting or exceeding the predetermined or specified level, evicting one or more methods contained in a largest evictable superblock of the plurality of evictable superblocks from the code cache repository to thereby reduce a fragmentation of free space in the code cache repository, and wherein the first candidate list corresponds to a first likelihood that the candidate virtual memory page will be accessed, the second candidate list corresponds to a second likelihood that the candidate virtual memory page will be accessed, and the third candidate list corresponds to a third likelihood that the candidate virtual memory page will be accessed; wherein the first likelihood is greater than the second likelihood; and wherein the second likelihood is greater than the third likelihood.

10. A computer program product comprising a non-transitory computer-readable storage medium having a computer-readable program stored therein, wherein the computer-readable program, when executed on a computing device including at least one processor, configures the at least one processor to:

in response to a determining that a candidate virtual memory page of a plurality of virtual memory pages is not in a physical memory, adding a page corresponding to the candidate virtual memory page to a first candidate list; and in response to the first candidate list containing a first memory block and a second memory block wherein the first memory block is adjacent in memory to the second memory block, merging the first memory block and the second memory block to form a first evictable superblock of a plurality of evictable superblocks.

11. The computer program product of claim 10 wherein the at least one processor is further configured for:

determining whether or not a current occupancy level of a code cache repository is meeting or exceeding a predetermined or specified threshold level; and in response to the current occupancy level of the code cache repository meeting or exceeding the predetermined or specified threshold level, traversing an operating system data structure to locate a respective page table entry corresponding to the candidate virtual memory page of a plurality of virtual memory pages that are a part of the code cache repository.

12. The computer program product of claim 11 wherein the at least one processor is further configured for:

determining whether or not the first candidate list contains a first memory block and a second memory block, wherein the first memory block is adjacent in memory to the second memory block.

13. The computer program product of claim 11 wherein each of the plurality of evictable superblocks is associated with a corresponding block size, said at least one processor is further configured for:

ordering the plurality of evictable superblocks according to the corresponding block size;

performing a test to ascertain whether or not the current cache occupancy level of the code cache repository meets or exceeds the predetermined or specified level;

performing a test to ascertain whether or not the first candidate list is empty; and in response to the current cache code occupancy level of the code cache repository meeting or exceeding the predetermined or specified level and the first candidate list not being empty, evicting one or more methods contained in a largest evictable superblock of the plurality of evictable superblocks from the code cache repository to thereby reduce a fragmentation of free space in the code cache repository.

14. The computer program product of claim 13 wherein said at least one processor is further configured for:

performing a test to ascertain whether or not the candidate virtual memory page is on an inactive list and a referenced flag is set;

in response to the candidate virtual memory page being on an inactive list and the referenced flag not being set, adding a page corresponding to the candidate virtual memory page to a second candidate list;

determining whether or not the current occupancy level of the code cache repository is meeting or exceeding the predetermined or specified threshold level;

in response to the current occupancy level of the code cache repository meeting or exceeding the predetermined or specified threshold level, determining whether or not the second candidate list contains a third memory block and a fourth memory block, wherein the third memory block is adjacent in memory to the fourth memory block; and in response to the second candidate list containing the third memory block and the fourth memory block wherein the third memory block is adjacent in memory to the fourth memory block, merging the third memory block and the fourth memory block to form a second evictable superblock of a plurality of evictable superblocks, each of the plurality of evictable superblocks being associated with a corresponding block size.

15. The computer program product of claim 14 said at least one processor is further configured for:

ordering the plurality of evictable superblocks according to the corresponding block size; performing a test to ascertain whether or not the current cache occupancy level of the code cache repository meets or exceeds the predetermined or specified level; and in response to the current cache code occupancy level of the code cache repository meeting or exceeding the predetermined or specified level, evicting one or more methods contained in a largest evictable superblock of the plurality of evictable superblocks from the code cache repository to thereby reduce a fragmentation of free space in the code cache repository.

16. The computer program product of claim 15, further comprising:

performing a test to ascertain whether or not the candidate virtual memory page is on an inactive list and a referenced flag is set;

in response to the candidate virtual memory page being on an inactive list and the referenced flag being set, adding a page corresponding to the candidate virtual memory page to a third candidate list;

determining whether or not the current occupancy level of the code cache repository is meeting or exceeding the predetermined or specified threshold level;

in response to the current occupancy level of the code cache repository meeting or exceeding the predetermined or specified threshold level, determining whether or not the third candidate list contains a fifth memory block and a sixth memory block, wherein the fifth memory block is adjacent in memory to the sixth memory block; and in response to the third candidate list containing the fifth memory block and the sixth memory block wherein the fifth memory block is adjacent in memory to the sixth memory block, merging the fifth memory block and the sixth memory block to form a third evictable superblock of a plurality of evictable superblocks, each of the plurality of evictable superblocks being associated with a corresponding block size.

17. The computer program product of claim 16, further comprising:

ordering the plurality of evictable superblocks according to the corresponding block size;

performing a test to ascertain whether or not the current cache occupancy level of the code cache repository meets or exceeds the predetermined or specified level; and in response to the current cache code occupancy level of the code cache repository meeting or exceeding the predetermined or specified level, evicting one or more methods contained in a largest evictable superblock of the plurality of evictable superblocks from the code cache repository to thereby reduce a fragmentation of free space in the code cache repository, and wherein the first candidate list corresponds to a first likelihood that the candidate virtual memory page will be accessed, the second candidate list corresponds to a second likelihood that the candidate virtual memory page will be accessed, and the third candidate list corresponds to a third likelihood that the candidate virtual memory page will be accessed; wherein the first likelihood is greater than the second likelihood; and wherein the second likelihood is greater than the third likelihood.

18. The computer program product of claim 14, wherein, prior to performing a test to ascertain whether or not the candidate virtual memory page is on an inactive list and a referenced flag is set, the method further comprises:

locating, in response to determining the candidate virtual memory page of the plurality of virtual memory pages is in the physical memory, a descriptor of a physical page frame for the candidate virtual memory page, and determining one or more characteristics associated with the physical page frame.

19. The computer-implemented method of claim 5, wherein, prior to performing a test to ascertain whether or not the candidate virtual memory page is on an inactive list and a referenced flag is set, the method further comprises:

locating, in response to determining the candidate virtual memory page of the plurality of virtual memory pages is in the physical memory, a descriptor of a physical page frame for the candidate virtual memory page, and determining one or more characteristics associated with the physical page frame.

20. The computer-implemented method of claim 5, wherein a processing of evictable superblocks is by a decreasing size order.

* * * * *